US012739003B2

(12) United States Patent
Guo

(10) Patent No.: US 12,739,003 B2
(45) Date of Patent: Sep. 15, 2026

(54) METHOD AND APPARATUS

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 446 days.

(21) Appl. No.: 18/347,555

(22) Filed: Jul. 5, 2023

(65) Prior Publication Data

US 2023/0353212 A1 Nov. 2, 2023

Related U.S. Application Data

(63) Continuation of application No. PCT/IB2022/050046, filed on Jan. 4, 2022.

(60) Provisional application No. 63/135,028, filed on Jan. 8, 2021.

(51) Int. Cl.
*H04B 7/06* (2006.01)
*H04B 17/318* (2015.01)
*H04B 17/336* (2015.01)

(52) U.S. Cl.
CPC ......... *H04B 7/0626* (2013.01); *H04B 17/328* (2023.05); *H04B 17/336* (2015.01)

(58) Field of Classification Search
CPC ................ H04B 7/0626; H04B 17/328; H04B 17/336; H04B 7/024
See application file for complete search history.

(56) References Cited

U.S. PATENT DOCUMENTS

| | | | | |
|---|---|---|---|---|
| 12,438,588 | B2 * | 10/2025 | Sun | H04B 7/022 |
| 2019/0297603 | A1 | 9/2019 | Guo et al. | |
| 2022/0014344 | A1 * | 1/2022 | Zhang | H04L 5/0048 |
| 2022/0140960 | A1 * | 5/2022 | Gao | H04L 5/0048 370/336 |
| 2022/0322361 | A1 * | 10/2022 | Zhu | H04L 5/0048 |
| 2023/0120578 | A1 * | 4/2023 | Khoshnevisan | H04L 1/0027 370/329 |

(Continued)

FOREIGN PATENT DOCUMENTS

| | | |
|---|---|---|
| CN | 109314871 | 2/2019 |
| CN | 110022192 | 7/2019 |

(Continued)

OTHER PUBLICATIONS

"3rd Generation Partnership Project; Technical Specification Group Radio Access Network; NR; Physical channels and modulation (Release 16)," 3GPP TS 38.211, Sep. 2020, v16.3.0.

(Continued)

*Primary Examiner* — Deepa Belur
(74) *Attorney, Agent, or Firm* — Hodgson Russ LLP

(57) ABSTRACT

Methods and an apparatus are provided. The method includes: receiving, at a user equipment (UE), configuration information from a next generation nodeB (gNB), where the gNB includes a first transmission/reception point (TRP) and a second TRP; requesting, by the gNB, the UE to report beam measurements for the first TRP and beam measurements for the second TRP; determining, by the UE, the beam measurements for the first TRP based on channel measurement resources (CMR) of the first TRP; and determining, by the UE, the beam measurements for the second TRP based on CMR of the second TRP.

11 Claims, 4 Drawing Sheets

(56) References Cited

U.S. PATENT DOCUMENTS

| | | | | |
|---|---|---|---|---|
| 2023/0246759 | A1* | 8/2023 | Yuan | H04L 5/0035<br>370/329 |
| 2023/0262503 | A1* | 8/2023 | Liu | H04L 5/005<br>370/252 |
| 2023/0283342 | A1* | 9/2023 | Ahmed Salem | H04B 7/066<br>370/329 |

FOREIGN PATENT DOCUMENTS

| | | | | |
|---|---|---|---|---|
| EP | 4192148 | A1 * | 6/2023 | H04L 5/0053 |
| WO | 2018232294 | | 12/2018 | |
| WO | 2020032621 | | 2/2020 | |
| WO | 2020034312 | | 2/2020 | |

OTHER PUBLICATIONS

"3rd Generation Partnership Project; Technical Specification Group Radio Access Network; NR; Multiplexing and channel coding (Release 16)," 3GPP TS 38.212, Sep. 2020, v16.3.0.
"3rd Generation Partnership Project; Technical Specification Group Radio Access Network; NR; Physical layer procedures for control (Release 16)," 3GPP TS 38.213, Sep. 2020, v16.3.0.
"3rd Generation Partnership Project; Technical Specification Group Radio Access Network; NR; Physical layer procedures for data (Release 16)," 3GPP TS 38.214, Sep. 2020, v16.3.0.
"3rd Generation Partnership Project; Technical Specification Group Radio Access Network; NR; Physical layer measurements (Release 16)," 3GPP TS 38.215, Sep. 2020, v16.3.0.
"3rd Generation Partnership Project; Technical Specification Group Radio Access Network; NR; Medium Access Control (MAC) protocol specification (Release 16)," 3GPP TS 38.321, Dec. 2020, v16.3.0.
"3rd Generation Partnership Project; Technical Specification Group Radio Access Network; NR; Radio Resource Control (RRC) protocol specification (Release 16)," 3GPP TS 38.331, Dec. 2020, v16.3.0.
WIPO, International Search Report and Written Opinion for International Application No. PCT/IB2022/050046, Mar. 29, 2022.
EPO, Extended European Search Report for EP Application No. 22736682.0, Apr. 2, 2024.
EPO, Communication for EP Application No. 22736682.0, Jun. 18, 2025.
EPO, Communication for EP Application No. 22736682.0, Dec. 20, 2024.
EPO, Communication for EP Application No. 22736682.0, Dec. 16, 2025.

* cited by examiner

METHOD AND APPARATUS

CROSS-REFERENCE TO RELATED APPLICATION(S)

This application is a continuation of International Application No. PCT/IB2022/050046, filed Jan. 4, 2022, which claims priority to U.S. Provisional Application No. 63/135,028, filed Jan. 8, 2021, the disclosures of which are hereby incorporated by reference in their entireties.

TECHNICAL FIELD

This application relates to the communications field, and more specifically, to methods and an apparatus.

BACKGROUNDS

Rapid growth in computing technology is creating a greater demand for data communication. The increasing demand in turn drives further growth in communication technology, including beam communication or operations. New radio (NR) or 5th generation (5G) communication system supports reference signal received power (RSRP)-based and signal to interference noise ratio (SINR)-based beam measurement and reporting. The current beam measurement and reporting methods, however, are not able to effectively support the transmission of multiple transmission/reception points (TRPs). With current methodologies, the system cannot choose the proper transmission (Tx) beam to transmit simultaneous physical downlink control channel (PDSCH) from multiple TRPs.

SUMMARY

In a first aspect, a method is provided. The method includes: receiving, at a user equipment (UE), configuration information from a next generation nodeB (gNB), wherein the gNB includes a first transmission/reception point (TRP) and a second TRP; requesting, by the gNB, the UE to report beam measurements for the first TRP and beam measurements for the second TRP; determining, by the UE, the beam measurements for the first TRP based on channel measurement resources (CMR) of the first TRP; and determining, by the UE, the beam measurements for the second TRP based on CMR of the second TRP.

In a second aspect, an apparatus of a user equipment (UE) is provided. The apparatus includes: a memory; a processor coupled to the memory and configured to: receive, from a next generation node B (gNB), configuration information, wherein the gNB includes a first transmission/reception point (TRP) and a second TRP; receive, from the gNB, a request to report beam measurements for the first TRP and beam measurements for the second TRP; determine the beam measurements for the first TRP based on CMR of the first TRP; and determine the beam measurements for the second TRP based on CMR of the second TRP.

In a third aspect, a method, executable by a user equipment (UE) is provided. The method includes: receiving, from a next generation node B (gNB), configuration information, wherein the gNB includes a first transmission/reception point (TRP) and a second TRP; receiving, from the gNB, a request to report beam measurements for the first TRP and beam measurements for the second TRP; determining the beam measurements for the first TRP based on CMR of the first TRP; and determining the beam measurements for the second TRP based on CMR of the second TRP.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

DETAILED DESCRIPTION

NR/5G system can support layer 1 RSRP (L1-RSRP)-based and layer 1 SINR (L1-SINR)-based beam measurement and reporting. For L1-RSRP-based beam reporting, a user equipment (UE) can be configured with up to 64 channel state information reference signal (CSI-RS) resources or synchronization signal physical broadcast channel (SS/PBCH) blocks for L1-RSRP measurement. The UE can select up to 4 CSI-RS resources or SS/PBCH blocks from those configured resources and then report the indicators of the selected CSI-RS resources or SS/PBCH blocks and corresponding L1-RSRP measurement results to a Next Generation NodeB (gNB). Group-based L1-RSRP beam reporting is also supported, in which the UE can be configured with a resource setting for channel measurement that contains a set of non-zero-power (NZP) CSI-RS resources or SS/PBCH blocks. Each NZP CSI-RS resource or SS/PBCH block can be used to represent one gNB transmit beam. The UE can be configured to measure the L1-RSRP of those NZP CSI-RS resources or SS/PBCH blocks. Then the UE can report two CSI-RS resource indicators (CRIs) or SS/PBCH block resource indicators (SSBRIs) for two selected NZP CSI-RS resources or SS/PBCH blocks, and the UE is able to use a single spatial domain receive filter or multiple simultaneous spatial domain receive filters.

L1-SINR based beam measurement and reporting is also specified. For L1-SINR based beam measurement and reporting, the UE can be configured with one of the following resource setting configurations:

- The UE is configured with one resource setting with a set of NZP CSI-RS resources for channel measurement and interference measurement.
- The UE is configured with two resource settings. The first resource setting has a set of NZP CSI-RS resources or SS/PBCH blocks for channel measurement and the second resource setting has a set of NZP CSI-RS resources or ZP CSI-RS resources for interference measurement.

For L1-SINR beam report, the UE can report up to 4 CRIs or SSBRIs and the corresponding L1-SINR measurement results. Group-based beam reporting of L1-SINR is also supported, in which the UE can report up to 2 CRIs or SSBRIs and the corresponding L1-SINR measurement results.

The current beam measurement and reporting methods are not able to effectively support the transmission of multi-TRP. Based on the beam reporting information specified in current methods, the system cannot choose the proper Tx beam to transmit simultaneous PDSCHs from two TRPs. The present disclosure provides methods and apparatuses for solving one or more of the above problems.

Figure 1:
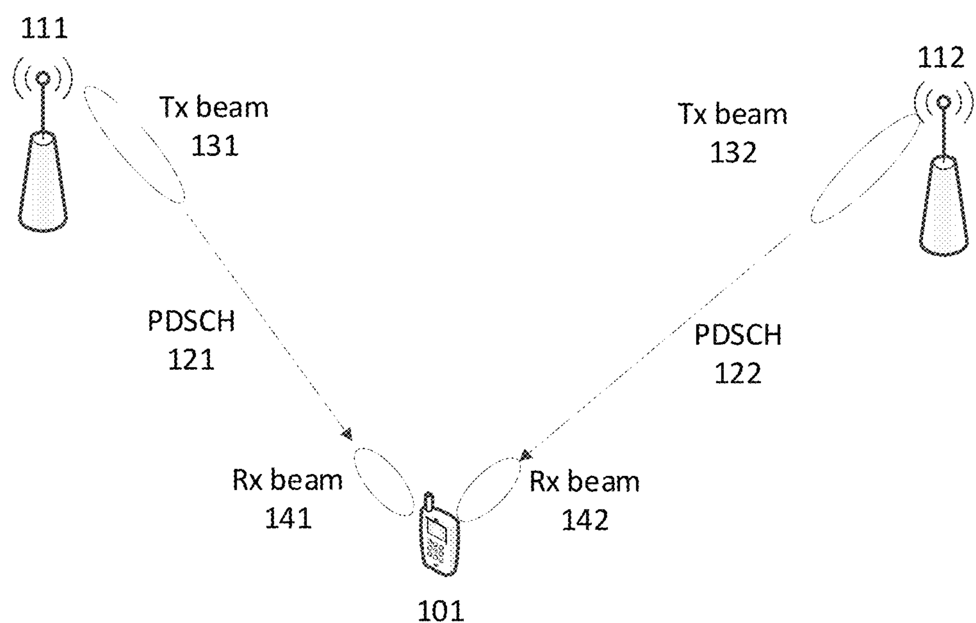
FIG. 1 is a schematic diagram of a wireless communication system in accordance with one or more implementations of the present disclosure.

FIG. 1 illustrates a wireless communications system 100 for implementing the present technology. As shown in FIG. 1, the wireless communications system 100 can be a multi-TRP transmission system that includes one or more TRPs (e.g., a TRP 111 and a TRP 112) that constitute a network device (or base station). Examples of the network device include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network device can include a relay station, an access point, an in-vehicle device, a wearable device, and the like. The network device can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network can be referred to as a new radio (New Radio, NR) system or network.

In FIG. 1, the wireless communications system 100 also includes a terminal device 101. The terminal device 101 can be an end-user device configured to facilitate wireless communication. The terminal device 101 can be configured to wirelessly connect to the network device (via, e.g., via a wireless channel 105) according to one or more corresponding communication protocols/standards. The terminal device 101 may be mobile or fixed. The terminal device 101 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 101 include a modem, a cellular phone, a smartphone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an Internet-of-Things (IoT) device, a device used in a 5G network, a device used in a public land mobile network, or the like. For illustrative purposes, FIG. 1 illustrates only one network device and one terminal device 101 in the wireless communications system 100. However, in some instances, the wireless communications system 100 can include additional network devices and/or terminal devices.

The terminal device 101 can be configured to receive PDSCH transmission from both the TRP 111 and the TRP 112. The TRP 111 can use transmission (Tx) beam 131 to transmit PDSCH 121 to the terminal device 101, while the TRP 112 can use Tx beam 132 to transmit PDSCH 122 to the terminal device 101. The PDSCH 121 and PDSCH 122 can be fully, partially or not overlapped in time domain. When PDSCH 121 and PDSCH 122 are fully or partially overlapped in time domain, on the Orthogonal frequency-division multiplexing (OFDM) symbols where both PDSCH 121 and PDSCH 1222 are transmitted, the terminal device 101 is capable of receiving the signals transmitted by both the Tx beam 131 and the Tx beam 132. Based on beam training, the terminal device 101 can be further configured to pair Rx beam 141 with Tx beam 131 and Rx beam 142 with Tx beam 132. Thus, to enable the terminal device 101 to receive signals transmitted by Tx beam 131 and Tx beam 132 on one same symbol, the terminal device 101 can be further configured to use Rx beam 141 and Rx beam 142 on the same symbol, i.e., simultaneously.

To facilitate the multi-TRP transmission the wireless communications system 100 can include the following functions. The terminal device 101 can be configured to measure multiple Tx beams from the TRP 111 and multiple Tx beams from the TRP 112. The terminal device 101 can be further configured to notify the system which Tx beam(s) of TRP 111 and Tx beam(s) of TRP 112 can be good candidates for downlink transmission. The wireless communications system 100 can choose the best Tx beam for TRP 112 and TRP 112 based on information (e.g., resource indicators, beam measurements) reported by the terminal device 101. Note that although only two TRPs have been described, the wireless communications system 100 can also support a third, fourth, or n-th TRP for beam measurement and reporting (where n is any predefined number) using similar configurations as those described above in relation to the TRP 111 or TRP 112. More details on the above functions are described below in relation to FIG. 2 and FIG. 3.

Figure 2:
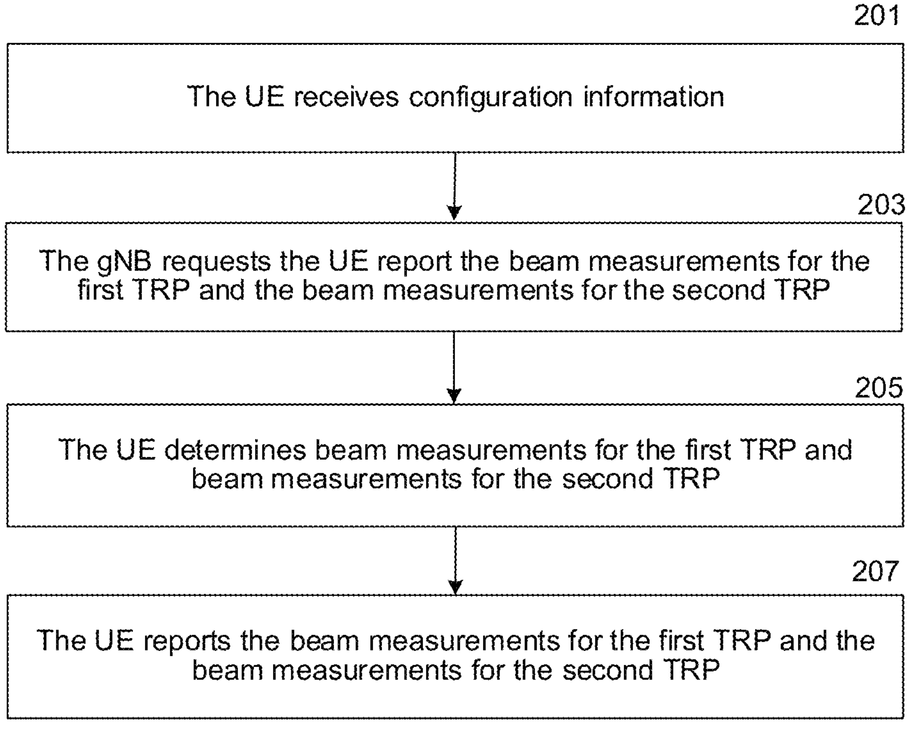
FIG. 2 is a flowchart of a method in accordance with one or more implementations of the present disclosure.

FIG. 2 is a flowchart of a method 200 in accordance with one or more implementations of the present disclosure. The method 200 can be implemented by a wireless communications system (e.g., the wireless communications system 100) that includes a terminal device or UE (e.g., the terminal device 101) and a network device or gNB (e.g., the network device described above in relation to FIG. 1) that includes one or more TRPs (e.g., the TRP 111 and TRP 112). The method 200 is for determining and reporting beam measurements of multiple TRPs.

At block 201, the UE receives configuration information. In some embodiments, the UE can receive the configuration information from the gNB. The configuration information can include a first set of CSI-RS resources and/or SS/PBCH blocks to measure Tx beams of a first TRP (e.g., the TRP 111) and a second set of CSI-RS resources and/or SS/PBCH blocks to measure Tx beams of a second TRP (e.g., the TRP 112). The first set of CSI-RS resources and/or SS/PBCH blocks can provide the channel measurement resources (CMR) of the first TRP and the second set of CSI-RS resources and/or SS/PBCH blocks can provide the CMR of the second TRP.

In some embodiments, the configuration information can include a resource setting that provides the CMRs for the two TRPs. For example, the UE can receive a resource setting, as indicated by a higher layer parameter, that includes a first list of non-zero-power (NZP) CSI-RS resources and/or SS/PBCH blocks as the CMR for the first TRP and a second list of NZP CSI-RS resources and/or SS/PBCH blocks as the CMR for the second TRP. Table 1 below is an example of a resource setting that is indicated by a higher layer parameter CSI-ResourceConfig. In Table 1, the nzp-CSI-RS-ResourceSetList can provide the CMR for the first TRP and the nzp-CSI-RS-ResourceSetList2nd can provide the CMR for the second TRP.

TABLE 1

```
CSI-ResourceConfig ::=            SEQUENCE {
   csi-ResourceConfigId              CSI-ResourceConfigId,
   csi-RS-ResourceSetList            CHOICE {
      nzp-CSI-RS-SSB                   SEQUENCE {
         nzp-CSI-RS-ResourceSetList SEQUENCE (SIZE (1..maxNrofNZP-CSI-RS-ResourceSetsPerConfig)) OF NZP-CSI-
RS-ResourceSetId
nzp-CSI-RS-ResourceSetList             SEQUENCE (SIZE (1..maxNrofNZP-CSI-RS-ResourceSetsPerConfig)) OF NZP-CSI-RS-
ResourceSetId                                                        OPTIONAL, -- Need R
         csi-SSB-ResourceSetList          SEQUENCE (SIZE (1..maxNrofCSI-SSB-ResourceSetsPerConfig)) OF CSI-SSB-
ResourceSetId OPTIONAL -- Need R
      },
nzp-CSI-RS-ResourceSetList2nd SEQUENCE (SIZE (1..maxNrofNZP-CSI-RS-ResourceSetsPerConfig)) OF NZP-CSI-
RS-ResourceSetId
nzp-CSI-RS-ResourceSetList             SEQUENCE (SIZE (1..maxNrofNZP-CSI-RS-ResourceSetsPerConfig)) OF NZP-CSI-RS-
ResourceSetId                                                          OPTIONAL, - Need R
         csi-SSB-ResourceSetList      SEQUENCE (SIZE (1..maxNrofCSI-SSB-ResourceSetsPerConfig)) OF CSI-SSB-
ResourceSetId OPTIONAL - Need R
      },
      csi-IM-ResourceSetList             SEQUENCE (SIZE (1..maxNrofCSI-IM-ResourceSetsPerConfig)) OF CSI-IM-ResourceSetId
   },
   bwp-Id                           BWP-Id,
   resourceType                        ENUMERATED { aperiodic, semiPersistent, periodic },
   ...
}
```

In some embodiments, the configuration information can include two sets of CSI-RS resources, in an aperiodic trigger state, that provide the CMRs for the first and second TRPs. When one of the aperiodic trigger states is indicated by a trigger in downlink control information (DCI) received from the gNB, the UE can, in response, measure the CMR of both TRPs and then subsequently report the measurement results. In some embodiments, the UE can determine the beam measurements for the first TRP and the second TRP in response to an aperiodic trigger state indicated in downlink control information received from the gNB. Table 2 is an example of a resource setting that is indicated by a higher layer parameter CSI-AperiodicTriggerState. In Table 2, the reosurcesForChannel can provide the CMR for the first TRP and the resourcesForChannel2nd can provide the CMR for the second TRP.

TABLE 2

```
CSI-AperiodicTriggerState ::=          SEQUENCE {
   associatedReportConfigInfoList                SEQUENCE (SIZE(1..maxNrofReportConfigPerAperiodicTrigger)) OF CSI-
AssociatedReportConfigInfo,
   ...
}
CSI-AssociatedReportConfigInfo ::= SEQUENCE {
   reportConfigId                     CSI-ReportConfigId,
   resourcesForChannel                   CHOICE {
      nzp-CSI-RS                        SEQUENCE {
         resourceSet                      INTEGER (1..maxNrofNZP-CSI-RS-ResourceSetsPerConfig),
         qcl-info                       SEQUENCE (SIZE(1..maxNrofAP-CSI-RS-ResourcesPerSet)) OF TCI-StateId
                                                                  OPTIONAL -- Cond Aperiodic
      },
      csi-SSB-ResourceSet                  INTEGER (1..maxNrofCSI-SSB-ResourceSetsPerConfig)
},
   resourcesForChannel2nd                    CHOICE {
      nzp-CSI-RS                        SEQUENCE {
         resourceSet                        INTEGER (1..maxNrofNZP-CSI-RS-ResourceSetsPerConfig),
         qcl-info                         SEQUENCE (SIZE(1..maxNrofAP-CSI-RS-ResourcesPerSet)) OF TCI-StateId
                                                                  OPTIONAL - Cond Aperiodic
      },
      csi-SSB-ResourceSet                    INTEGER (1..maxNrofCSI-SSB-ResourceSetsPerConfig)
   },
   csi-IM-ResourcesForInterference           INTEGER(1..maxNrofCSI-IM-ResourceSetsPerConfig)              OPTIONAL, -- Cond
CSI-IM-ForInterference
   nzp-CSI-RS-ResourcesForInterference INTEGER (1..maxNrofNZP-CSI-RS-ResourceSetsPerConfig)          OPTIONAL, --
Cond NZP-CSI-RS-ForInterference
   ...
}
```

At block 203, the gNB requests the UE to report the beam measurements for the first TRP and the beam measurements for the second TRP. For example, when the UE is provided with the CMR of the first TRP and the CMR of the second TRP, the UE can be requested to measure the CSI-RS resources and/or SS/PBCH blocks configured as the CMR of the first TRP and measure the CSI-RS resources and/or SS/PBCH blocks configured as the CMR of the second TRP.

At block 205, the UE determines beam measurements for the first TRP and the beam measurements for the second TRP based on the received configuration information. The UE can determine the beam measurement results for the first TRP based on the CMR of the first TRP. The UE can also determine the beam measurement results for the second TRP based on the CMR of second TRP. More details on the UE determining beam measurements for the first and second TRPs are described below in relation to FIG. 3.

At block 207, the UE reports the beam measurements for the first TRP and the beam measurements for the second TRP. In some embodiments, the UE can report the beam measurements for both TRPs simultaneously as combined information even though the two TRPs can be two different antenna points situated at two different locations. By reporting the beam measurements for the first and second TRPs, the method 200 can allow the wireless communications system 100 to determine which Tx beam(s) of the first TRP and the second TRP are the best candidates for subsequent downlink transmission. The CSI-RS resources and/or SS/PBCH blocks for the two different TRPs, transmitted by the gNB, can subsequently be received simultaneously by the UE. Accordingly, the method 200 is able to double the transmit throughput and radio channel efficiency of the wireless communications system 100. More details on the UE reporting beam measurements are describe below in relation to FIG. 3. Note that although only two TRPs have been described, the method 200 can also support a third, fourth, or n-th TRP for beam measurement and reporting (where n is any predefined number configured by the wireless communications system 100) using similar methodologies as those described above in relation to the first or second TRPs.

Figure 3:
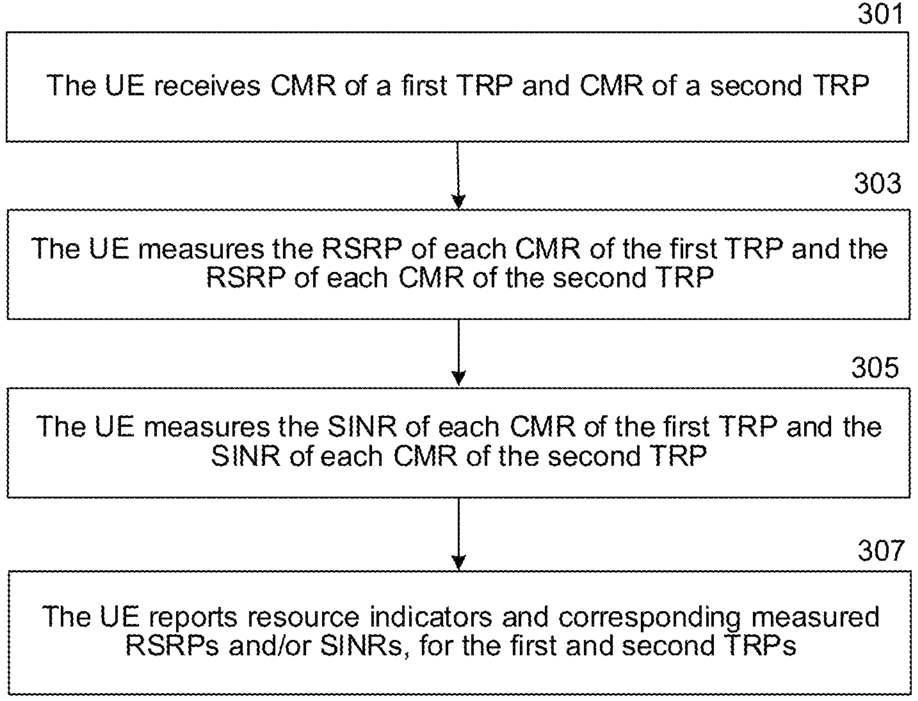
FIG. 3 is a flowchart of a method in accordance with one or more implementations of the present disclosure.

FIG. 3 is a flowchart of a method 300 in accordance with one or more implementations of the present disclosure. The method 300 can be implemented by a wireless communications system (e.g., the wireless communications system 100) that includes a terminal device or UE (e.g., the terminal device 101) and a network device or gNB (e.g., the network device described above in relation to FIG. 1) that includes one or more TRPs (e.g., the TRP 111 and TRP 112). The method 300 is for determining and reporting beam measurements of multiple TRPs. In some embodiments, the method 300 can be triggered when performing the method 200.

At block 301, the UE receives CMR of a first TRP and CMR of a second TRP. In some embodiments, the UE can receive, from the gNB, the CMRs for the first and second TRPs as part of the configuration information described in relation to block 201 of the method 200. In particular, the UE can receive a first set of CSI-RS resources and/or SS/PBCH blocks as the CMR of the first TRP and a second set of CSI-RS resources and/or SS/PBCH blocks as the CMR of the second TRP. The UE can be requested, by e.g., the gNB, to report RSRP measurements of the CSI-RS resources in the first set and the RSRP measurements of the CSI-RS resources in the second set. The RSRP measurements can be, in some instances, L1-RSRP measurements. In some embodiments, the first and second set of CSI-RS resources are each non-zero-power CSI-RS (NZP CSI-RS) resources.

In some embodiments, the UE can further receive, as part of the configuration information, one or more sets of NZP CSI-RS resources and/or CSI-interference measurement (CSI-IM) resources for subsequent interference measurements as requested by, e.g., the gNB. For instance, the UE can receive a third set of CSI-RS resources or CSI-IM resources and/or a fourth set of CSI-RS resources or CSI-IM resources. The third and/or fourth set of CSI-RS resources can be NZP CSI-RS resources. More details on using the third and/or fourth sets of CSI-RS resources or CSI-IM resources for beam measurements are described below in relation to block 305.

At block 303, the UE measures the RSRP of each CMR of the first TRP and the RSRP of each CMR of the second TRP. In particular, the UE can measure a RSRP of each CSI-RS resource and/or SS/PBCH block of the CMR of the first TRP. Similarly, the UE can measure a RSRP of each CSI-RS resource and/or SS/PBCH block of the CMR of the second TRP.

At block 305, the UE measures the signal to interference noise ratio (SINR) of each CMR of the first TRP and the RSRP of each CMR of the second TRP. In some embodiments, the method 300 performs block 305 when the UE: (1) is requested, by the gNB, to perform interference measurements; and/or (2) receives, from the gNB, NZP CSI-RS resources or CSI-IM resources for interference measurements. In particular, the UE can measure a SINR of each CSI-RS resource and/or SS/PBCH block of the CMR of the first TRP. Likewise, the UE can measure a SINR of each CSI-RS resource and/or SS/PBCH block of the CMR of the second TRP. The SINR measurements can be, in some instances, L1-SINR measurements.

In some embodiments, the UE can measure the SINR of each of the CMR of the first TRP based on the third set of CSI-RS resources (e.g., NZP CSI-RS resources). In particular, the UE can estimate interference using the third set and then calculate L1-SINR with the CMR of the first TRP. The UE can also measure the SINR of each of the CMR of the second TRP based on the third set of CSI-RS resources. In particular, the UE can estimate interference using the third set and then calculate L1-SINR with the CMR of the second TRP.

In some embodiments, the UE can measure the SINR of each of the CMR of the first and second TRPs based on the third and fourth sets of CSI-RS resources (e.g., NZP CSI-RS resources), respectively. The UE can measure the SINR of each of the CMR of the first TRP based on the third set of CSI-RS resources. In particular, the UE can estimate interference using the third set and then calculate L1-SINR with the CMR of the first TRP. The UE can measure the SINR of each of the CMR of the second TRP based on the fourth set of CSI-RS resources. In particular, the UE can estimate interference using the fourth set and then calculate L1-SINR with the CMR of the second TRP.

At block 307, the UE reports resource indicators and the measured RSRP and/or SINRs, for the first and second TRPs. In various of the following described embodiments, the UE can report, to the gNB, the resource indicators and measured RSRP and/or SINRs (e.g., the beam measurements of block 303 and/or block 305). A resource indicator can be (1) a CRI that indicates a CSI-RS resource selected by the UE, or (2) a SSBRI that indicates a SS/PBCH block selected by the UE. Each resource indicator can also correspond to a measured RSRP and/or SINR of the CSI-RS resource and/or SS/PBCH indicated by the resource indicator.

In some embodiments, the UE can report K pairs of resource indicators and corresponding beam measurements.

K can be a predefined number, configured by the wireless communications system 100, that is less than or equal to the size of the first set of CMR or second set of CMR. In particular, the UE can report K pairs, each including:

(1) a first CSI-RS resource indicator (CRI) or SS/PBCH block resource indicator (SSBRI) that indicates a CSI-RS resource or SS/PBCH block, respectively, selected from the CMR of the first TRP, and (2) the corresponding measured RSRP and/or SINR of the CSI-RS resource or SS/PBCH block selected from the CMR of the first TRP; and (1) a second CRI or SSBRI corresponding to a CSI-RS resource or SS/PBCH block, respectively, selected from the CMR of the second TRP, and (2) the corresponding measured RSRP and/or SINR of the CSI-RS resource or SS/PBCH block selected from the CMR of the second TRP.

In other words, the UE can report K pairs of {a first CRI or SSBRI, a second CRI or SSBRI} and the corresponding RSRP measurements of the first and second CRIs or SSBRIs. For example, the UE can report K pairs of: {(a first CRI or SSBRI, RSRP measurements and/or SINR of the first CRI or SSBRI), (a second CRI or SSBRI, RSRP measurements and/or SINR of the second CRI or SSBRI)}. Here in each of those K pairs, a first CRI or SSBRI with a value of k can correspond to a (k+1)-th entry of the first set of CSI-RS resources or SS/PBCH blocks, while a second CRI or SSBRI with a value of k can correspond to a (k+1)-th entry of the second set of CSI-RS resources or SS/PBCH blocks. For example, when a first CRI or SSBRI has a value of k=0 (e.g., represented by 3 bits: 000), the first CRI or SSBRI can indicate that the (k+1)-th=1st entry of the first set of CSI-RS resources or SS/PBCH blocks has been selected by the UE. As another example, when a second CRI or SSBRI has a value of k=2 (e.g., represented by 3 bits: 010), the second CRI or SSBRI can indicate that the (k+1)-th=3rd entry of the second set of CSI-RS resources or SS/PBCH blocks has been selected by the UE.

Moreover, in each pair, the SINR of the first CRI or SSBRI can be calculated, at block 305, based on the interference measurement resources (IMR) associated with the second CRI or SSBRI (e.g., the NZP CSI-RS resource or CSI-IM resource indicated by the second CRI or SSBRI). Likewise, the SINR of the second CRI or SSBRI can be calculated, at block 305, based on the IMR associated with the first CRI or SSBRI (e.g., the NZP CSI-RS resource or CSI-IM resource indicated by the second CRI or SSBRI). In other words, the L1-SINR of the CMR indicated by the first CRI or SSBRI can be calculated based on assuming the resources (e.g., NZP CSI-RS resources or CSI-IM resources) indicated by the second CRI or SSBRI is the IMR, and the L1-SINR of the CMR indicated by the second CRI or SSBRI can be calculated based on assuming the resources (e.g., NZP CSI-RS resources or CSI-IM resources) indicated by the first CRI or SSBRI is the IMR.

In each reported pair, the two different CSI-RS resources or SS/PBCH blocks, selected by the UE from the CMRs of the first and second TRPs, can be received simultaneously by the UE. In various embodiments, the two different CSI-RS resources or SSB resources reported in a pair can be received simultaneously by the UE with different spatial domain receive filters.

In some embodiments, the UE reports a first reporting group and a second reporting group, each with N resource indicators and corresponding beam measurements (e.g., RSRP and/or SINR). The N resource indicators and corresponding beam measurements of the first reporting group can correspond to any N of the CMR of the first TRP, while the N resource indicators and the corresponding beam measurements of the second reporting group can correspond to any N of the CMR of the second TRP. N can be a predefined number, configured by the wireless communications system 100, that is less than or equal to the size of the first set of CMR or second set of CMR. A CRI or SSBRI with a value of k in the first reporting group can correspond to a (k+1)-th entry selected from the first set of CSI-RS resources or SS/PBCH blocks. A CRI or SSBRI with a value of k in the second reporting group can correspond to a (k+1)-th entry selected from the second set of CSI-RS resources or SS/PBCH blocks.

Any two different CSI-RS resources or SS/PBCH blocks, indicated in the two different reporting groups, can be received simultaneously by the UE. In various embodiments, any two different CSI-RS resources or SS/PBCH blocks in two different reporting groups can be received simultaneously by the UE with different spatial domain receive filters.

Moreover, in each reporting group, the UE can use differential L1-RSRP based reporting. The differential L1-RSRP value can be computed by multiplying a predefined dB step size with the largest L1-RSRP value in a reporting group. For example, the measured RSRP of each of the CMR of the first TRP can be a differential L1-RSRP value computed based on multiplying the dB step size and the largest L1-RSRP value in the first reporting group. The measured RSRP of each of the CMR of the second TRP can be a differential L1 RSRP value computed based on multiplying the dB step size and the largest L1-RSRP value in the second reporting group. When the UE also reports SINR beam measurements, the UE can use differential L1-SINR based reporting. The differential L1-SINR value can be computed by multiplying a predefined dB step size with the largest L1-SINR value in a reporting group. For example, the measured SINR of each of the CMR of the first TRP can be a differential L1-SINR value computed based on multiplying the dB step size and the largest L1-SINR value in the first reporting group. The measured SINR of each of the CMR of the second TRP can be a differential L1-SINR value computed based on multiplying the dB step size and the largest L1-SINR value in the second reporting group.

In some embodiments, the UE can be configured with a first reporting setting and a second reporting setting through the configuration information. The configuration information can also provide the UE with an association between the first reporting setting and the second reporting setting. In one example, the UE can report one or more resource indicators (e.g., CRI or SSBRI) and corresponding beam measurements (e.g., RSRP and/or SINR) for the first reporting setting in a first CSI report instance. The UE can report one or more resource indicators (e.g., CRI or SSBRI) and corresponding beam measurements (e.g., RSRP and/or SINR) for the second reporting setting in a second CSI report instance. When the second CSI report instance is a latest CSI report instance before the first CSI report instance, any of the CMR of the first TRP as indicated by the reported resource indicators and any of the CMR of the second TRP as indicated by the reported resource indicators are capable of being received, by the UE, simultaneously. In various embodiments, the first CSI report instance and/or the second CSI report instance can include an indicator of whether the one or more CMR of the first TRP as indicated by the reported resource indicators and the one or more CMR of the second TRP as indicated by the reported resource indicators are capable of being received simultaneously.

Note that although only two TRPs have been described, the method 300 can also support a third, fourth, or n-th TRP for beam measurement and reporting (where n is any predefined number configured by the wireless communications system 100) using similar methodologies as those described above in relation to the first or second TRPs.

Figure 4:
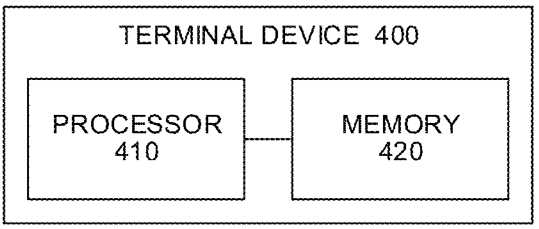
FIG. 4 is a schematic block diagram of a terminal device in accordance with one or more implementations of the present disclosure.

FIG. 4 is a schematic block diagram of a terminal device 400 (e.g., an example of the terminal device 101 of FIG. 1) in accordance with one or more implementations of the present disclosure. As shown in FIG. 4, the terminal device 400 includes a processing unit 410 (e.g., a DSP, a CPU, a GPU, etc.) and a memory 420. The processing unit 410 can be configured to implement instructions that correspond to the method 200 of FIG. 2 and the method 300 of FIG. 3 and/or other aspects of the implementations described above. The processing unit 410 may also be coupled to the memory.

It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A method performed by a user equipment (UE) and comprising:

receiving configuration information from a next generation nodeB (gNB), wherein the gNB includes a first transmission/reception point (TRP) and a second TRP, the first TRP is different from the second TRP, and the configuration information includes:

(1) a first set of channel state information reference signal (CSI-RS) resources or synchronization signal physical broadcast channel (SS/PBCH) blocks as channel measurement resources (CMR) of the first TRP to measure transmission (Tx) beams thereof; and (2) a second set of CSI-RS resources or SS/PBCH blocks as CMR of the second TRP to measure Tx beams thereof;

receiving, from the gNB, a request to report beam measurements for the first TRP and beam measurements for the second TRP;

determining, by the UE, the beam measurements for the first TRP based on the CMR of the first TRP, wherein determining the beam measurements for the first TRP comprises:

measuring, by the UE, a reference signal received power (RSRP) of each CSI-RS resource or SS/PBCH block of the CMR of the first TRP and/or measuring, by the UE, a signal to interference noise ratio (SINR) of each CSI-RS resource or SS/PBCH block of the CMR of the first TRP;

determining, by the UE, the beam measurements for the second TRP based on the CMR of the second TRP, wherein determining the beam measurements for the second TRP comprises:

measuring, by the UE, a RSRP of each CSI-RS resource or SS/PBCH block of the CMR of the second TRP and/or measuring, by the UE, a SINR of each CSI-RS resource or SS/PBCH block of the CMR of the second TRP; and reporting, by the UE to the gNB, the beam measurements for the first TRP and the beam measurements for the second TRP, wherein reporting the beam measurements comprises:

reporting, by the UE to the gNB, K pairs of resource indicators and corresponding beam measurements, wherein K is a predefined number less than or equal to a size of the first set and a size of the second set, and each pair of the K pairs includes:

(1) a first CSI-RS resource indicator (CRI) or SS/PBCH block resource indicator (SSBRI) that indicates a CSI-RS resource or SS/PBCH block, respectively, selected from the CMR of the first TRP, and (2) the corresponding measured RSRP and/or SINR of the CSI-RS resource or SS/PBCH block selected from the CMR of the first TRP; and (1) a second CRI or SSBRI corresponding to a CSI-RS resource or SS/PBCH block, respectively, selected from the CMR of the second TRP, and (2) the corresponding measured RSRP and/or SINR of the CSI-RS resource or SS/PBCH block selected from the CMR of the second TRP, each pair is in a form of {(the first CRI or SSBRI, RSRP measurements and/or SINR of the first CRI or SSBRI), (the second CRI or SSBRI, RSRP measurements and/or SINR of the second CRI or SSBRI)};

wherein:

the first CRI or SSBRI with a value of k corresponds to a (k+1)-th entry in the CMR of the first TRP;

the second CRI or SSBRI with the value of k corresponds to a (k+1)-th entry in the CMR of the second TRP;

in each pair, the CSI-RS resource or SS/PBCH block selected from the CMRs of the first and second TRPs are capable of being received simultaneously by the UE; and in each pair:

the measured SINR corresponding to the first CRI or SSBRI is calculated based on assuming resources indicated by the second CRI or SSBRI are interference measurement resources (IMR), and the measured SINR corresponding to the second CRI or SSBRI is calculated based on assuming resources indicated by the first CRI or SSBRI are IMR.

2. The method of claim 1, wherein, in each pair, the CSI-RS resource or SS/PBCH block selected from the CMRs of the first and second TRPs are capable of being received simultaneously by the UE with different spatial domain receive filters.

3. An apparatus of a user equipment (UE), the apparatus comprising:

a memory;

a processor coupled to the memory and configured to:

receive, from a next generation node B (gNB), configuration information, wherein the gNB includes a first transmission/reception point (TRP) and a second TRP, the first TRP is different from the second TRP, and the configuration information includes:

(1) a first set of channel state information reference signal (CSI-RS) resources or synchronization signal physical broadcast channel (SS/PBCH) blocks as channel measurement resources (CMR) of the first TRP to measure transmission (Tx) beams thereof, and (2) a second set of CSI-RS resources or SS/PBCH blocks as CMR of the second TRP to measure Tx beams thereof;

receive, from the gNB, a request to report beam measurements for the first TRP and beam measurements for the second TRP;

determine the beam measurements for the first TRP based on the CMR of the first TRP, wherein determining the beam measurements for the first TRP comprises:

measuring a reference signal received power (RSRP) of each CSI-RS resource or SS/PBCH block of the CMR of the first TRP and/or measuring a signal to interference noise ratio (SINR) of each CSI-RS resource or SS/PBCH block of the CMR of the first TRP;

determine the beam measurements for the second TRP based on the CMR of the second TRP, wherein determining the beam measurements for the second TRP comprises:

measuring a RSRP of each CSI-RS resource or SS/PBCH block of the CMR of the second TRP and/or measuring a SINR of each CSI-RS resource or SS/PBCH block of the CMR of the second TRP; and report to the gNB the beam measurements for the first TRP and the beam measurements for the second TRP, wherein reporting the beam measurements comprises:

reporting to the gNB, K pairs of resource indicators and corresponding beam measurements, wherein K is a predefined number less than or equal to a size of the first set and a size of the second set, and each pair of the K pairs includes:

(1) a first CSI-RS resource indicator (CRI) or SS/PBCH block resource indicator (SSBRI) that indicates a CSI-RS resource or SS/PBCH block, respectively, selected from the CMR of the first TRP, and (2) the corresponding measured RSRP and/or SINR of the CSI-RS resource or SS/PBCH block selected from the CMR of the first TRP; and (1) a second CRI or SSBRI corresponding to a CSI-RS resource or SS/PBCH block, respectively, selected from the CMR of the second TRP, and (2) the corresponding measured RSRP and/or SINR of the CSI-RS resource or SS/PBCH block selected from the CMR of the second TRP, each pair is in a form of {(the first CRI or SSBRI, RSRP measurements and/or SINR of the first CRI or SSBRI), (the second CRI or SSBRI, RSRP measurements and/or SINR of the second CRI or SSBRI)};

wherein:

the first CRI or SSBRI with a value of k corresponds to a (k+1)-th entry in the CMR of the first TRP;

the second CRI or SSBRI with the value of k corresponds to a (k+1)-th entry in the CMR of the second TRP;

in each pair, the CSI-RS resource or SS/PBCH block selected from the CMRs of the first and second TRPs are capable of being received simultaneously by the UE; and in each pair:

the measured SINR corresponding to the first CRI or SSBRI is calculated based on assuming resources indicated by the second CRI or SSBRI are interference measurement resources (IMR), and the measured SINR corresponding to the second CRI or SSBRI is calculated based on assuming resources indicated by the first CRI or SSBRI are IMR.

4. The apparatus of claim 3, wherein reporting the beams measurements comprises:

reporting, to the gNB, a first reporting group and a second reporting group, each with N resource indicators and corresponding beam measurements, wherein the N resource indicators and the corresponding beam measurements of the first reporting group correspond to N of the CMR of the first TRP, wherein the N resource indicators and the corresponding beam measurements of the second reporting group correspond to N of the CMR of the second TRP, and wherein N is a predefined number less than or equal to the size of the first set and the size of the second set.

5. The apparatus of claim 4, wherein the measured RSRP of each of the CMR of the first TRP is a differential layer 1 RSRP (L1-RSRP) value computed based on a dB step size and the largest L1-RSRP value in the first reporting group, wherein the measured RSRP of each of the CMR of the second TRP is a differential L1 RSRP value computed based on the dB step size and the largest L1-RSRP value in the second reporting group, wherein the measured SINR of each of the CMR of the first TRP is a differential layer 1 SINR (L1-SINR) value computed based on the dB step size and the largest L1-SINR value in the first reporting group, and/or wherein the measured SINR of each of the CMR of the second TRP is a differential L1-SINR value computed based on the dB step size and the largest L1-SINR value in the second reporting group.

6. The apparatus of claim 3, wherein the configuration information further includes: a third set of CSI-RS resources or CSI-interference measurement (CSI-IM) resources.

7. The apparatus of claim 6, wherein measuring the SINR of each of the CMR of the first TRP is based on the third set of CSI-RS resources or CSI-IM resources, and wherein measuring the SINR of each of the CMR of the second TRP is based on the third set of CSI-RS resources or CSI-IM resources; or wherein the configuration information further includes: a fourth set of CSI-RS resources or CSI-IM resources, wherein measuring the SINR of each of the CMR of the first TRP is based on the third set of CSI-RS resources or CSI-IM resources, and wherein measuring the SINR of each of the CMR of the second TRP is based on the fourth set of CSI-RS resources or CSI-IM resources.

8. The apparatus of claim 3, wherein reporting the beams measurements comprises:

reporting, to the gNB, one or more resource indicators and corresponding beam measurements, corresponding to one or more of the CMR of the first TRP, in a first CSI report instance; and reporting, to the gNB, one or more resource indicators and corresponding beam measurements, corresponding to one or more of the CMR of the second TRP, in a second CSI report instance.

9. The apparatus of claim 8, wherein the second CSI report instance is a latest CSI report instance before the first CSI report instance, and any of the CMR of the first TRP and any of the CMR of the second TRP are capable of being received simultaneously.

10. A method performed by a next generation nodeB (gNB) and comprising:

transmitting configuration information to a user equipment (UE), wherein the gNB includes a first transmission/reception point (TRP) and a second TRP, the first TRP is different from the second TRP, and the configuration information includes:

(1) a first set of channel state information reference signal (CSI-RS) resources or synchronization signal physical broadcast channel (SS/PBCH) blocks as channel measurement resources (CMR) of the first TRP to measure transmission (Tx) beams thereof; and (2) a second set of CSI-RS resources or SS/PBCH blocks as CMR of the second TRP to measure Tx beams thereof;

transmitting, to the UE, a request to report beam measurements for the first TRP and beam measurements for the second TRP;

receiving, from the UE, the beam measurements for the first TRP and the beam measurements for the second TRP, wherein the beam measurements for the first TRP are determined by the UE based on the CMR of the first TRP by measuring a reference signal received power (RSRP) of each CSI-RS resource or SS/PBCH block of the CMR of the first TRP and/or measuring a signal to interference noise ratio (SINR) of each CSI-RS resource or SS/PBCH block of the CMR of the first TRP; and the beam measurements for the second TRP are determined by the UE based on the CMR of the second TRP by measuring a RSRP of each CSI-RS resource or SS/PBCH block of the CMR of the second TRP and/or measuring a SINR of each CSI-RS resource or SS/PBCH block of the CMR of the second TRP; and wherein the beam measurements comprise K pairs of resource indicators and corresponding beam measurements, wherein K is a predefined number less than or equal to a size of the first set and a size of the second set, and each pair of the K pairs includes:

(1) a first CSI-RS resource indicator (CRI) or SS/PBCH block resource indicator (SSBRI) that indicates a CSI-RS resource or SS/PBCH block, respectively, selected from the CMR of the first TRP, and (2) the corresponding measured RSRP and/or SINR of the CSI-RS resource or SS/PBCH block selected from the CMR of the first TRP; and (1) a second CRI or SSBRI corresponding to a CSI-RS resource or SS/PBCH block, respectively, selected from the CMR of the second TRP, and (2) the corresponding measured RSRP and/or SINR of the CSI-RS resource or SS/PBCH block selected from the CMR of the second TRP, each pair is in a form of {(the first CRI or SSBRI, RSRP measurements and/or SINR of the first CRI or SSBRI), (the second CRI or SSBRI, RSRP measurements and/or SINR of the second CRI or SSBRI)};

wherein:

the first CRI or SSBRI with a value of k corresponds to a (k+1)-th entry in the CMR of the first TRP;

the second CRI or SSBRI with the value of k corresponds to a (k+1)-th entry in the CMR of the second TRP;

in each pair, the CSI-RS resource or SS/PBCH block selected from the CMRs of the first and second TRPs are capable of being received simultaneously by the UE; and in each pair:

the measured SINR corresponding to the first CRI or SSBRI is calculated based on assuming resources indicated by the second CRI or SSBRI are interference measurement resources (IMR), and the measured SINR corresponding to the second CRI or SSBRI is calculated based on assuming resources indicated by the first CRI or SSBRI are IMR.

11. The method of claim 10, wherein, in each pair, the CSI-RS resource or SS/PBCH block selected from the CMRs of the first and second TRPs are capable of being received simultaneously by the UE with different spatial domain receive filters.

* * * * *